L. F. CRANE.
AUTOMATIC TIRE PUMP.
APPLICATION FILED DEC. 22, 1916.

1,229,039.

Patented June 5, 1917.
3 SHEETS—SHEET 1.

Witnesses

Inventor
L. F. Crane,
By Victor J. Evans
Attorney

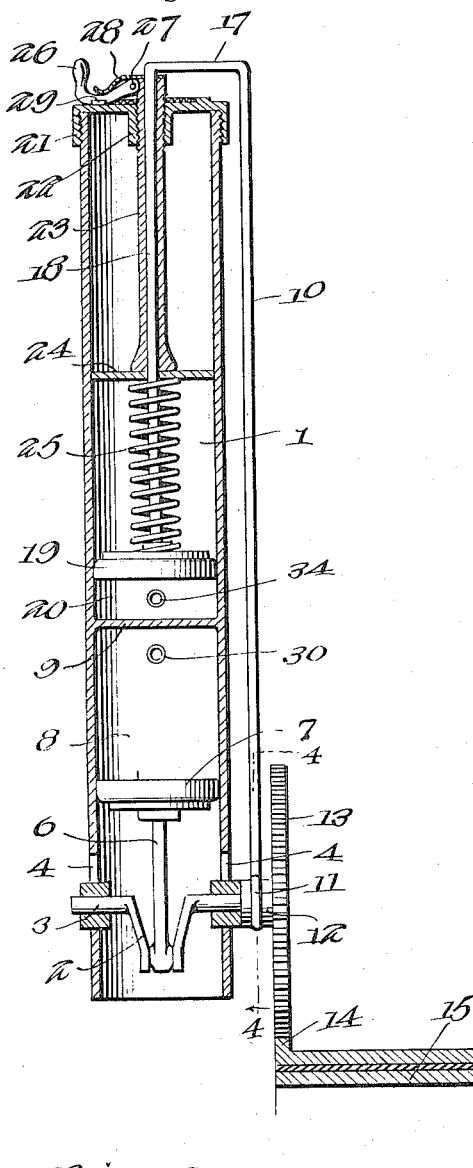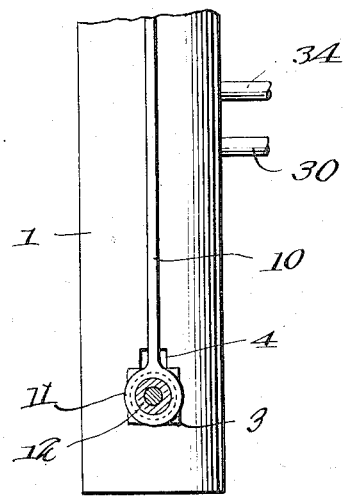

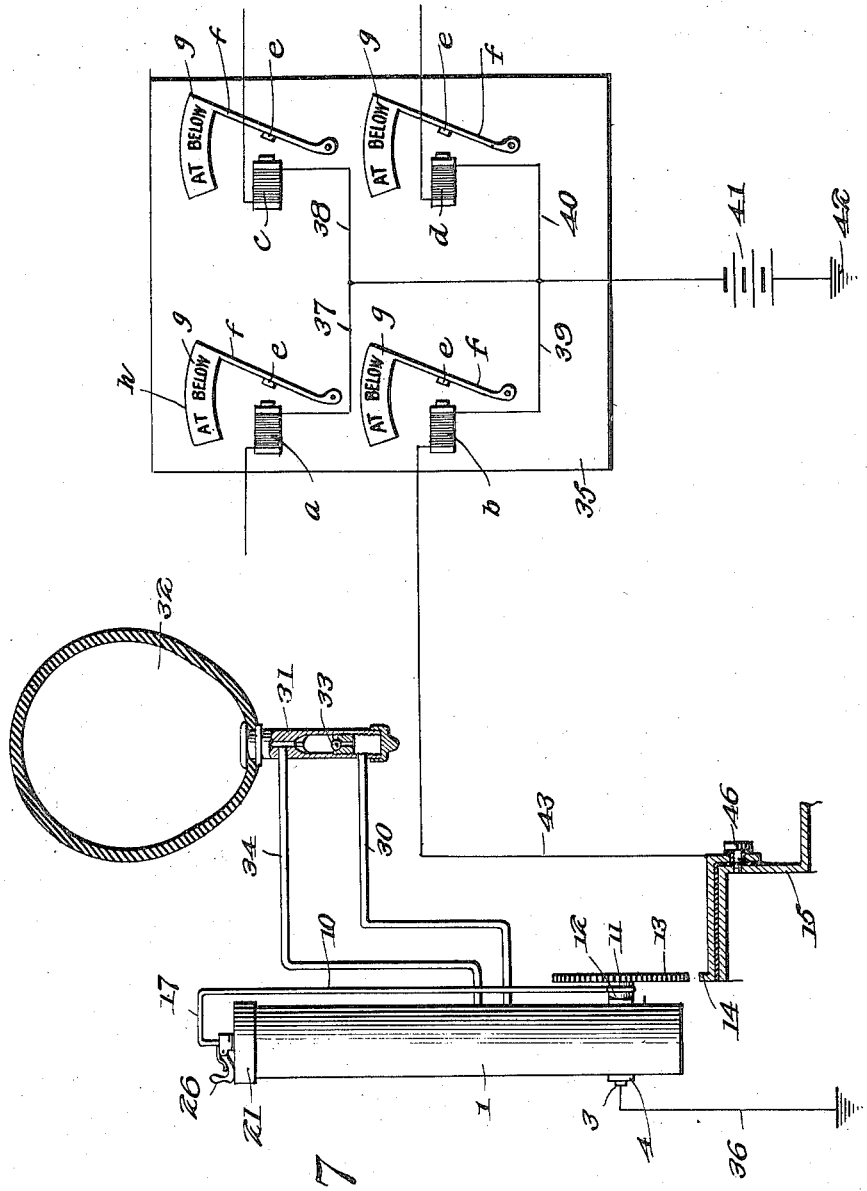

UNITED STATES PATENT OFFICE.

LESLIE FRED CRANE, OF LANSING, MICHIGAN.

AUTOMATIC TIRE-PUMP.

1,229,039.  Specification of Letters Patent.  Patented June 5, 1917.

Application filed December 22, 1916. Serial No. 138,429.

*To all whom it may concern:*

Be it known that I, LESLIE F. CRANE, a citizen of the United States, residing at Lansing, in the county of Ingham and State of Michigan, have invented new and useful Improvements in Automatic Tire-Pumps, of which the following is a specification.

This invention relates to automatic tire inflating pumps, the object of the invention being to produce a multiple pumping apparatus embodying a pump or air compressor mounted upon and carried by each of the wheels of a motor vehicle and adapted to be automatically thrown into and out of operation as the pressure reaches or falls below a predetermined point in the tire of that wheel.

Another object of the invention is to provide in conjunction with each of the pumps or air compressors, means for regulating the point at which each pump will be thrown into and out of operation.

Another object in view is to electrically connect all of the pumps or air compressors with a common annunciator or indicator which will show at a glance whether the tires are inflated to the full extent required and also indicate which tire or tires need inflation, and whether the air pressure is at or below normal.

A still further object of the invention is to provide apparatus of the character above referred to applicable as a whole to any motor vehicle and adapted to be applied to such vehicle either at the time of manufacture or subsequent thereto.

With the above and other objects in view, the invention consists in the novel construction, combination and arrangement of parts, as herein described, illustrated and claimed.

In the accompanying drawings:—

Fig. 2 is an enlarged longitudinal section through one of the pumps, showing also a portion of one of the vehicle axle housings and the pump driving mechanism.

Fig. 4 is a fragmentary section on the line 4—4 of Fig. 2.

Fig. 5 is a detail perspective view of one form of driving wheel of the split type.

Fig. 6 is a view looking toward the outer end of the pump.

Fig. 7 is a general diagrammatic view illustrating the working relation of the several parts of the apparatus.

Figure 1:
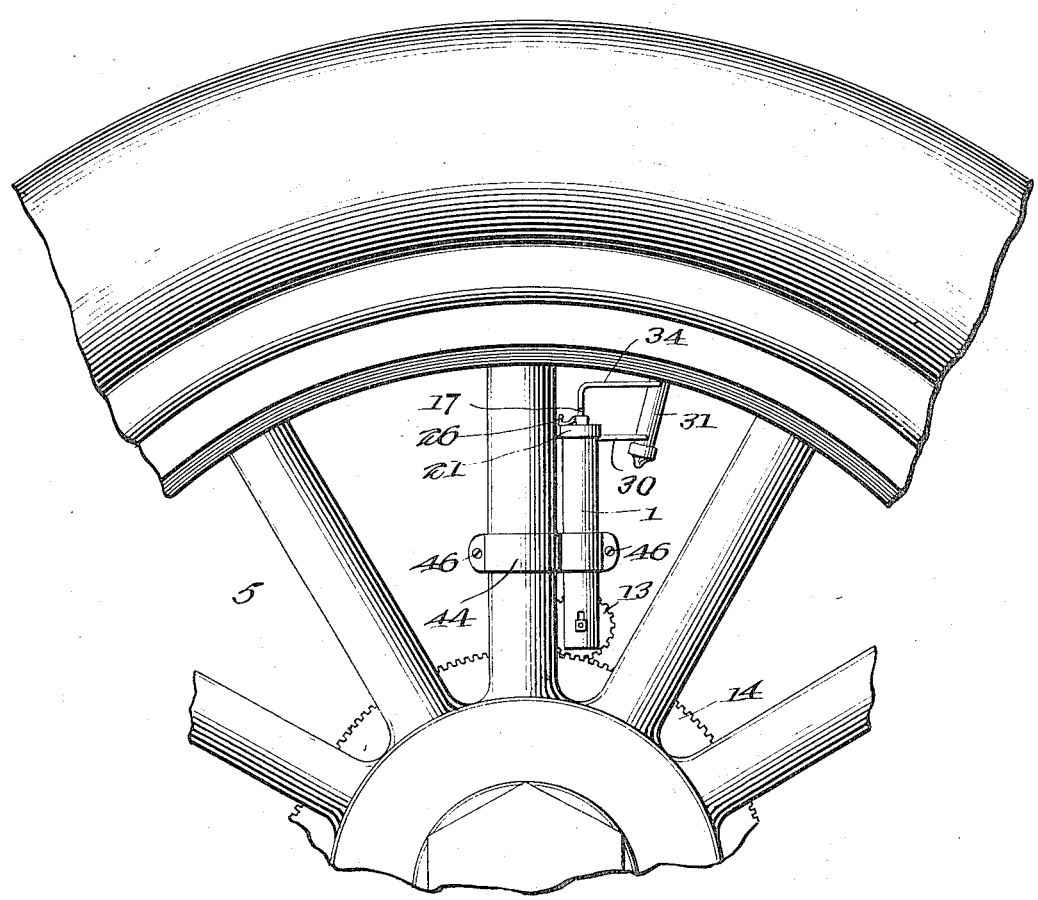
Figure 1 is a side elevation of a vehicle wheel showing one of the pumps applied thereto.
Figure 3:
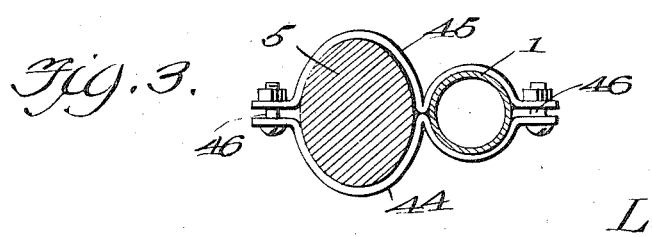
Fig. 3 is a fragmentary section taken transversely of a pump and one of the adjacent spokes, showing the pump supporting and clamping means.

The apparatus contemplated in this invention comprises a pump or air compressor for each of the vehicle wheels, usually four in number. Each pump or air compressor comprises a barrel or cylinder 1 having arranged preferably at the inner end thereof or that end which is adjacent to the wheel hub, a crank shaft 2 which is journaled in bearings 3 slidable in slots or ways 4 extending longitudinally of the barrel 1 in order that the crank shaft 2 may be shifted to a limited extent toward and away from the center of the wheel, the vehicle wheel being indicated at 5. A connecting rod 6 extends from the crank shaft 2 to an air compressing piston 7 which is mounted in the compressing chamber 8 formed in the lower end portion of the chamber 1 and divided from the outer end portion of said barrel by means of an air tight transverse partition 9.

The means for shifting the crank shaft 2 toward and away from the center of the wheel consists of a rod 10 the lower extremity of which comprises a ring or loop 11 which works in an annular groove in a collar 12 on the crank shaft 2, the collar 12 being ordinarily loose on said crank shaft so that the latter may turn therein. Fast on the inner end of the crank shaft 2 and arranged at the inner side of the wheel 5 is a gear 13 adapted to be shifted into and out of mesh with another gear 14 which may be mounted fast on the rear axle housing 15 or on the front axle adjacent to one of the front wheels of the machine, the driving gear 14 coöperating with the gear 13 serving to impart motion to the piston 7 of the air compressor when the wheel 13 is shifted into engagement with the wheel 14.

It is preferred to diametrically divide or split the wheel 14, forming the same into equal sections and fastening the sections together and clamping the same upon the axle housing by means of bolts 16 or the equivalent thereof. This enables the wheel 14 to be applied to an axle housing at any time subsequent to the manufacture of the vehicle.

The rod 10 which acts as the shifting means for the crank shaft 2, extends along the outside of the barrel or cylinder 1 and beyond the outer end thereof where it is recurved or bent as shown at 17 and extended to form a return portion 18 which extends into the outer end of the barrel 1 and has fast on the inner end thereof a pressure head 19 having an air tight fit in said barrel or cylinder and leaving a pressure chamber 20 between said pressure head and the partition 9. The outer end of the barrel 1 has fastened thereto an end wall or cap 21 which is internally threaded as shown at 22 to receive a tension tube 23 threaded through the cap 21 and bearing at its inner end against a pressure plate or washer 24. A coiled expansion spring 25 surrounds the portion 18 of the rod 10 and bears at one end against the plate or washer 24 and bears at its opposite end against the pressure head 19. The tube 23 has extending laterally from the upper end thereof a crank arm 26 by means of which the tube 23 may be turned for the purpose of placing the spring 25 under greater or less tension. The crank arm 26 is connected to the tube 23 by a pivot 27. A spring 28 on said crank arm serves to press the same toward the adjacent head or cap 21 of the barrel or cylinder 1 so that it will engage notches in an arcuate rack 29. This rack may be numbered to indicate different tire inflating pressures such as 60, 70 and 80 pounds and the like.

From the air compressing chamber 8, an air pipe 30 leads to the valve tube 31 of the inner tube 32 of the tire of the respective wheel, the compressed air, forced through the pipe 30, being forced past the valve 33 in the tube 31 into the inner tube 32 of the tire. A pressure pipe 34 extends from the tube 31 between the valve 33 and the tube 32 into the pressure chamber 20 and the air therein acts against the pressure head 19 to move the same away from the partition 9 resulting in the shifting of the crank shaft 2 in the same direction and the movement of the gear 13 out of mesh with the gear 14.

35 designates an annunciator or indicator body containing a plurality of electromagnets $a$, $b$, $c$ and $d$, there being one of such magnets for each air compressor and vehicle wheel. In connection with each of said electromagnets there is employed a pivoted arm $f$, carrying a metal contact piece $e$, each arm also carrying a plate $g$ or indicator body and containing the words "at" and "below", or words of like import to indicate whether the pressure is at normal or below normal. Openings $h$ are formed in the face plate of the indicator so that either one of said words are read through the opening according to the position of the respective armature.

The shaft 2 is grounded by a wire 36 leading to the machine frame, and the electromagnets are connected by the wires 37, 38, 39 and 40 to a source of electrical energy 41 grounded at 42. A wire 43 leads from each driving gear 14 to the respective electromagnet. Therefore when the gear 13 touches the gear 14, the respective magnet is energized thereby attracting the adjacent contact pieces and shifting the plate $g$ so as to display the word "below", indicating that the pressure has fallen below the predetermined or normal point. When the pressure is raised to the predetermined point, the wheel 13 moves out of contact with the wheel 14 thereby breaking the circuit and deënergizing the respective electromagnet when the plate $g$ returns to a position where the word "at" is displayed. The wheel 14 is of course insulated from the part to which it is secured or from the wheel to which it is fastened so that no short circuit will occur.

Each pump barrel 1 is preferably mounted between two adjacent spokes of the wheel so as to be in alinement with the spokes and said barrel is connected to the adjacent spoke by means of a two-part clamp embodying twin sections 44 and 45 connected by clamping bolts 46 or the like, said clamp embracing the pump barrel and the spoke by which said barrel is supported.

From the foregoing description taken in connection with the accompanying drawings it will now be understood that as the pressure in the inner tube 32 decreases, there is a corresponding decrease in pressure in the chamber 20. This permits the pressure head 19 to move inwardly and by means of the rod 10, the crank shaft 2 is shifted toward the center of the wheel until the gear 13 meshes with the gear 14. This throws the crank shaft into operation and air is compressed in the chamber 8 and forced into the valve tube 31 and past the valve 33 into the inner tube. When the pressure reaches the predetermined point which is regulated by the adjustment of the crank arm 26, the pressure head 19 is moved against the tension of the spring 25 and the wheel 13 is shifted out of mesh with the wheel 14, whereupon the operation of the air compressor is terminated. The operator by glancing at the indicator may observe whether or not the tires are all properly inflated and if not, which one needs attention. Should one of the pumps become impaired or be insufficient for any reason to perform its work, the indicator will show which pump is at fault, enabling the operator of the machine to repair or adjust said pump without making any tests to find out which pump is at fault or which tire requires inflation. Should any pump get out of order the ordinary portable hand pump may be connected to the valve tube and the tire inflated in the usual way.

I claim:—

1. The combination with a pneumatic tire, and a wheel upon which said tire is mounted, of an air compressing pump embodying a barrel attached to and supported by one of the wheel spokes, an imperforate partition located between the ends of said barrel, an air compressing piston working in said barrel at one side of said partition, a crank shaft to which said piston is connected, a gear on said crank shaft, a driving gear with which the gear on the crank shaft is adapted to mesh, means for shifting the crank shaft bodily to throw the gear thereon into and out of mesh with the driving gear, said means comprising a pressure head located at the opposite side of the partition in the pump barrel, a connection between said pressure head and said crank shaft, means for resisting the movement of said pressure head, a compressed air pipe leading from the piston chamber into the valve tube of the tire at the outer side of the valve, and a return pressure equalizing pipe extending from said valve tube into the chamber formed between the pressure head and said partition.

2. The combination with a pneumatic tire, and a wheel upon which said tire is mounted, of an air compressing pump embodying a barrel attached to and supported by one of the wheel spokes, an imperforate partition located between the ends of said barrel, an air compressing piston working in said barrel at one side of said partition, a crank shaft to which said piston is connected, a gear on said crank shaft, a driving gear with which the gear on the crank shaft is adapted to mesh, means for shifting the crank shaft bodily to throw the gear thereon into and out of mesh with the driving gear, said means comprising a pressure head located at the opposite side of the partition in the pump barrel, a connection between said pressure head and said crank shaft, means for resisting the movement of said pressure head, a compressed air pipe leading from the piston chamber into the valve tube of the tire at the outer side of the valve, a return pressure equalizing pipe extending from said valve tube into the chamber formed between the pressure head and said partition, and means for tensioning said pressure head resisting means.

3. The combination with a pneumatic tire, and a wheel upon which said tire is mounted, of an air compressing pump embodying a barrel attached to the wheel and carried thereby, an imperforate partition located between the ends of said barrel, an air compressing piston working in said barrel at one side of said partition, a rotary crank shaft to which said piston is connected, a stationary pump actuating member on the machine frame, an air pressure operated head working in said barrel at the opposite side of said partition, pressure equalizing means between the tire and the chamber formed between said partition and pressure head, and means controlled by said pressure head for throwing said crank shaft into and out of gear with said stationary pump actuating member.

In testimony whereof I affix my signature.

LESLIE FRED CRANE.